United States Patent [19]

Coulbourn

[11] 4,373,471
[45] Feb. 15, 1983

[54] MONITORING LIQUID CONSUMPTION OF A LABORATORY ANIMAL

[76] Inventor: John N. Coulbourn, Box 2551, Lehigh Valley, Pa. 18001

[21] Appl. No.: 287,255

[22] Filed: Jul. 27, 1981

[51] Int. Cl.³ .............................................. A01K 7/00
[52] U.S. Cl. .................................... 119/72; 119/72.5; 250/221
[58] Field of Search ................. 119/1, 29, 54, 72, 72.5; 250/221; 235/92 V

[56] References Cited

U.S. PATENT DOCUMENTS

| | | | |
|---|---|---|---|
| 3,540,413 | 11/1970 | Castaigne | 119/1 |
| 3,693,590 | 9/1972 | Bowers | 119/1 |
| 3,782,334 | 1/1974 | Leon et al. | 119/54 |

Primary Examiner—Hugh R. Chamblee
Attorney, Agent, or Firm—Ruth Moyerman

[57] ABSTRACT

A method of measuring the liquid consumption of a laboratory animal is disclosed which does not involve passage of an electric current through its body. Instead, a drinking station is established within which the end of a drinking tube is located. The tube is supplied from a reservoir and a meniscus of liquid is present at its end. A photo-electric source and a photo-electric cell are provided as companion units. The beam emanating from the source is directed so that, en route to the cell, it passes the distal end of the tube. The tube and the beam are adjusted with respect to each other so that the beam of light is broken only when the animal is drinking, whether it is of a species which drinks by licking or by sucking. Output of the cell is linked to a counter thus enabling liquid consumption to be monitored.

An apparatus for measuring the liquid consumption of a laboratory animal is also disclosed. This apparatus comprises a plate which generally defines a planar perimeter of a drinking station. In the drinking station there is positioned the distal end of a feeding tube, the proximal end of which is connected to a source of liquid located outside of the station. A photo-electric cell and a companion photo-electric source are provided as well as means for guiding, piping or directing the beam of light en route from source to cell past the distal end of the tube. Means are also provided for adjusting the position of the beam with respect to the end of the tube. The output of the cell is linked to a counter. Breaking of the beam occurs only when the animal is drinking and the number of times the beam is broken triggers the counter and enables monitoring of consumption patterns.

10 Claims, 4 Drawing Figures

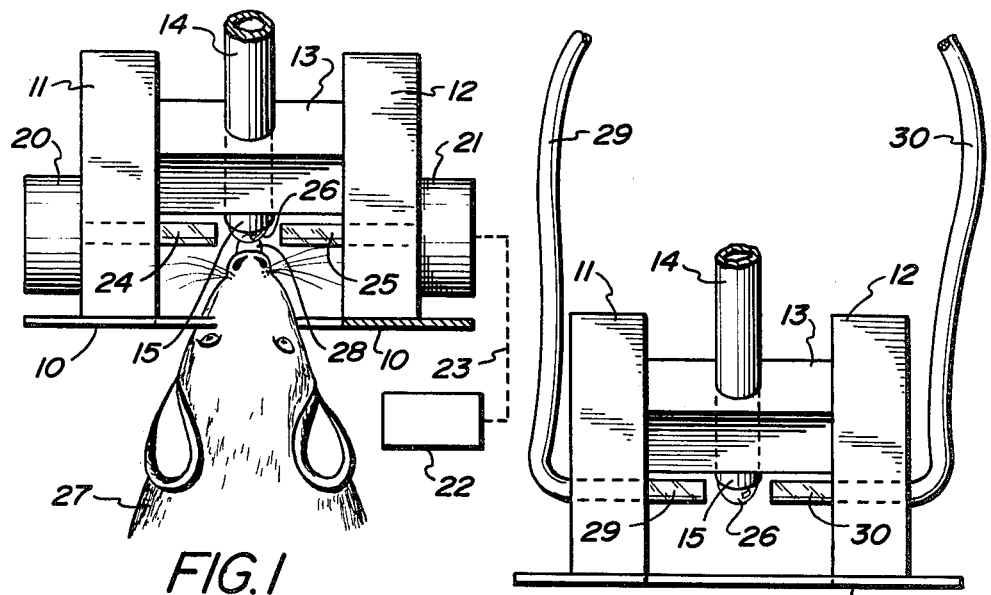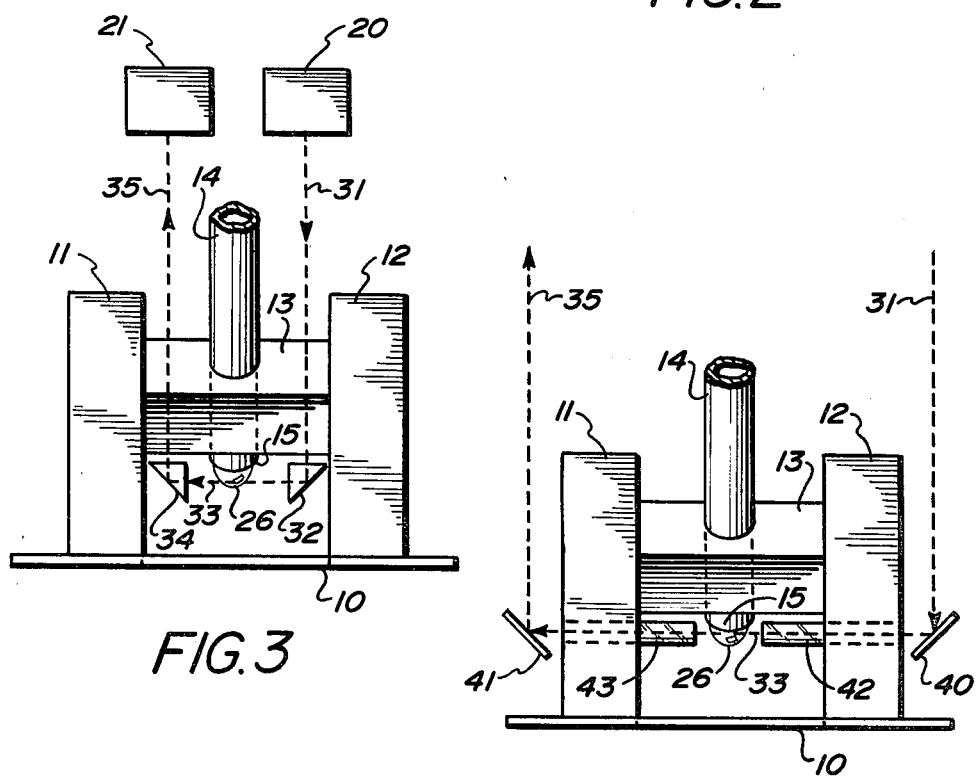

MONITORING LIQUID CONSUMPTION OF A LABORATORY ANIMAL

BACKGROUND OF THE INVENTION

1. Field of the Invention

This invention relates to the measurement of liquid flow by the counting of incremental flow volumes. More particularly, it relates to a method of measuring the liquid consumption of laboratory animals which involves a counting of licks from a drinking tube and apparatus useful in the practice of the method.

2. Description of the Prior Art

In the utilization of laboratory animals for various experiments, one of the parameters which frequently must be monitored is the animal's liquid consumption. Obviously this could be done by labor-intensive means such as having the animal drink from a calibrated source, the level of which is read from time to time. However, such a method—while giving total consumption over the period between readings—will give no continuous consumption profile nor meaningful rate information. Furthermore, such a method does not permit linkage to a computer such as by creation of a signal which can be converted into standard digital logic pulses.

Current methodology utilizes a drinking monitor which relies on having the animal complete a circuit when it takes liquid from a source such as a standard drinking tube. The tube is connected to a source of low current electric potential, as is the floor of the drinking station upon which the animal will stand when drinking. Touching of the source by the animal completes the circuit. The monitor, in effect, counts and records the frequency of circuit closure and sometimes length of closure as well. These, when correlated to the drinking habits of particular species of animals, measure volume consumed.

Such systems are indeed linkable to computers and are not labor-intensive. However, from their very nature, an electrical current (albeit of an order of magnitude of 4 microamperes or less) must pass through the body of the animal.

These prior art devices, while relatively sophisticated, have their own peculiar problems. The electrical currents can affect the chemistry of the liquid being fed to the animal as well as its perceived taste. Furthermore, the liquid and the drinking tube both have to be conductive to insure operability. Additionally, the existence of a fluid meniscus can cause constant contact reports thus effectively immobilizing the system. But the most important disadvantages of such systems hinge on the necessity for having current flow through the body of the animal. There is no real certainty about the long range effect on animal behaviour of such frequent flow of current through its body. Also, it is impossible to conduct meaningful experiments involving bioelectric stimulation, foot shock or attached cutaneous electrode shock simultaneously with animal drinking without thereby creating interference.

Consequently, a need exists for some method of monitoring the liquid consumption of a laboratory animal which is accurate, which counts every lick of liquid from a drinking tube and which, while computer linkable, does not depend either on passing current through the body of the animal or on the conductivity of the system components and of the liquid itself.

While no patent search has been made, it is believed that the prior art is fairly summarized above.

SUMMARY OF THE INVENTION

Briefly summarized, the present invention pertains to a method of monitoring the liquid consumption of laboratory animals and apparatus useful in practicing the method. These animals may or may not be confined in a cage but, in any event, the method is practiced by establishing a liquid feeding station.

If one is dealing with a caged animal housed in a modular cage, such as that shown in U.S. Pat. No. 3,830,201 granted to John Coulbourn on Aug. 20, 1974, the liquid feeding station may be incorporated into a module. Alternatively stated, a liquid feeding station is merely a site pre-selected as the locus for practicing of the method.

Located at the feeding station is the terminus of a drinking tube, the other end of which is connected to a source (e.g. reservoir, bottle, container or the like) of the liquid which is to be consumed by the animal. The tube is sized so that a meniscus of liquid is maintained at its end. However, there is no flow unless and until the animal (depending upon its species) licks or sucks the tube. Such drinking tubes are standard items of manufacture.

Also provided proximate the station are a photo-electric source and a companion photo-electric cell. These are positioned at or near the liquid feeding station, out of reach of the animal. The beam of light generated by the source is directed or piped in any of a variety of ways, to one side of the meniscus and from there back to the photo-electric cell. There is thus created a photo circuit which contains a gap spanning the meniscus.

The gap and drinking tube terminus are adjustable with respect to each other (such as by slidingly positioning the drinking tube) so as to create a situation where only true drinking by the animal breaks the beam. The action of breaking the beam is sharp and positive. Consequently, as many as 25 discrete licks per second can be detected and counted.

The output of the cell is linked to a counter. This may be of any of a variety of standard types and may include an amplifier which converts signals into standard Digital logic pulses which can then be used for logic functions.

The method and apparatus embodying its logic thus overcome the disadvantages of the prior art discussed above.

Accordingly, it is an object of the invention to provide a method and apparatus for monitoring liquid consumption of a laboratory animal which does not involve passing current through any portion of the animal's body nor require the use of electrically conductive components or liquids.

It is also an object of the invention to provide a method, the logic of which is not limited to any particular apparatus or configuration thereof, but rather has great latitude in utilization.

Still another object of the invention is to provide a monitoring method and apparatus which permit simultaneous bioelectric stimulation, foot shock or attached cutaneous shock of an animal while it is drinking.

Yet another object of the invention is to provide a monitoring method and apparatus wherein the existence of a liquid meniscus does not upset the monitoring process.

An overall object of the invention is to provide a monitoring method which counts all liquid consumption of an animal, even when such consumption is in the form of a large number of rapid licks as frequent as, for example, 25 per second.

These and other objects of the invention will be apparent to those skilled in the art from a consideration of the description of exemplary embodiments which follows. It should be appreciated that the foregoing Summary and the appended Abstract are intended as tools for information retrieval and are not included for purposes of limiting or interpreting the true scope of the invention. This is the function only of the appended claims.

BRIEF DESCRIPTION OF THE DRAWING(S)

In the drawing, wherein like numerals designate like parts:

FIG. 1 represents a diagrammatic plan view of apparatus embodying a first method of practicing the invention and also shows an animal licking a meniscus of liquid.

FIG. 2 represents a diagrammatic plan view of a modification of the apparatus shown in FIG. 1, wherein fibre optics are utilized.

FIG. 3 represents a diagrammatic plan view of another modification of the apparatus shown in FIG. 1 wherein optical prisms are utilized.

FIG. 4 represents a diagrammatic plan view of still another modification of the apparatus shown in FIG. 1, wherein mirrors are used.

DETAILED DESCRIPTION OF THE PREFERRED EMBODIMENT(S)

FIG. 1 shows a feeding station which is generally defined by a plate 10. On this plate are mounted a left post 11 and a right post 12, which serve to further define the station as well as to support apparatus components. A cross-bracket 13 spans from post 11 to post 12 and is pivotally mounted on each of them. As a consequence, bracket 13 can be rotatably positioned about its transverse axis.

Cross-bracket 13 serves to slideably receive and frictionally retain therethrough a drinking tube 14, the terminus 15 of which protrudes through the bracket. Due to the rotatability of cross-bracket 13, combined with the slideability of tube 14 therethrough, the terminus 15 can be positioned within the station over a wide range of locations.

Post 11 also supports a photo-electric source 20, which is mounted thereon. Similarly mounted on post 12 is a companion photo-electric cell 21. Wiring and ancillary devices form no part of the invention and are not shown. The output of cell 21 is linked to counter 22 by linkage 23.

As shown in FIG. 1, a beam of light extends from source 20, through a glass feed rod 24, spans across to a glass return rod 25 and thence to light cell 21. A gap exists between the distal end of rod 24 and the proximal end of rod 25. This gap exists in the vicinity of terminus 15 and its precise location can be adjusted by slideable positioning of tube 14 and rotational orientation of cross-bracket 13. Rods 24 and 25 may also be telescoped, respectively, into posts 11 and 12 for further adjustment depending on the size of the animal to be dealt with.

When in use, liquid feed to tube 14 is adjusted so that a meniscus of fluid 26 exists at terminus 15. A laboratory animal 27, whose tongue is designated 28, licks the meniscus 26 and thereby its tongue breaks the beam of light to trigger the counter 22. Where the animal is of a type which sucks rather than licks, appropriate adjustments can be made so that covering of terminus 15 by the animal's mouth breaks the beam.

The embodiment shown in FIG. 2 differs only in its utilization of optical fibre bundles 29 and 30. Bundle 29 comes from source 20 and bundle 30 goes to cell 21. This arrangement permits location of the photo-electric components at a position more remote from the liquid feeding station.

The FIG. 3 embodiment uses optical prisms to direct the beam of light. The beam originates in source 20, travels downwardly in vertical path 31 to a first prism 32, which reflects it into horizontal path 33. After entering a second prism 34, the beam is again reflected vertically upward and travels along path 35 to cell 21, thereby completing the circuit. Path 33 passes the meniscus 26, thus being broken when the meniscus is touched.

Another variant is shown in FIG. 4. This is similar to the FIG. 3 variant, with the following exceptions: mirrors 40 and 41 functionally replace prisms 32 and 34. Also, guide sleeves 42 and 43 are retractably mounted in posts 12 and 11. These serve as path guides and prevent attenuation of the beam. They can also be retracted as needed to accommodate animals with larger snouts.

The same method logic is common to all of these apparatus embodiments and they are by no means exhaustive of the possibilities. Consequently, the invention is not to be construed as limited to the details of the specific embodiments which have been described above. Rather, it is to be limited only by a reasonable interpretation of the appended claims.

What is claimed is:

1. A method of monitoring liquid consumption of a laboratory animal which does not involve passing an electric current through any portion of the body of said animal, comprising the steps of:
    (a) establishing a liquid feeding station;
    (b) locating the terminus of a drinking tube within said station and connecting the other end of said tube to a source of the liquid to be consumed by the animal, thus maintaining a meniscus of liquid at said terminus;
    (c) providing a photo-electric source and a companion photo-electric cell proximate said station but out of reach of said animal;
    (d) piping a beam of light from said source to one side of said meniscus and piping said beam back to said cell from the other side of said meniscus, thereby completing a photo-electric circuit containing a gap therein which spans said meniscus;
    (e) adjusting the location of the gap with respect to said tube terminus, as a function of the species of animal being monitored, so that the particular animal directly breaks the beam of light only when it is taking fluid from the drinking tube;
    (f) linking the output of the photocell to a counter; and,
    (g) counting the number of times the beam of light is broken;
whereby the drinking habits of the animal are accurately monitored.

2. The method of claim 1 wherein the beam of light is piped via glass rods.

3. The method of claim 1 wherein the beam of light is piped utilizing optical fibres.

4. The method of claim 1 wherein the beam of light is piped utilizing optical prisms.

5. The method of claim 1 wherein the beam of light is piped utilizing mirrors.

6. Apparatus for monitoring liquid consumption of a laboratory animal comprising:
 (a) a plate which generally defines a planar perimeter of a liquid feeding station;
 (b) a feeding tube supported from said plate, said tube being adapted for connection to a liquid source remote from said station, at its proximal end and having its distal end located within the confines of said station;
 (c) a photo-electric source and a companion photo-electric cell located proximate the station but out of reach of the laboratory animal;
 (d) means for directing light from said photo-source to said photo-cell via the distal end of said tube;
 (e) means for positioning the distal end of said tube with respect to said directed light so that the beam is directly broken by the animal only when it touches the tube in the course of consuming liquid; and,
 (f) a counter linked to said cell for monitoring the number of times the beam is broken;
whereby liquid consumption of a laboratory animal may be monitored without passing electric current through any portion of its body.

7. The apparatus of claim 6 wherein said positioning means include a cross bracket through which said tube is slideably mounted and frictionally retained, said bracket being pivotally mounted in a plane parallel to said plate.

8. The apparatus of claim 6 wherein said means for directing light comprise a glass tube having a gap proximate said distal end.

9. The apparatus of claim 6 wherein said means for directing light comprise optical glass fibers.

10. The apparatus of claim 6 wherein said means for directing light includes reflecting surfaces which bend the beam at an angle which completes the light path from source to cell.

* * * * *